(12) United States Patent
Nara et al.

(10) Patent No.: US 7,225,104 B2
(45) Date of Patent: May 29, 2007

(54) METHOD AND PROGRAM FOR ESTIMATING UNCERTAINTY

(75) Inventors: Masayuki Nara, Tsukuba (JP); Makoto Abbe, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/325,135

(22) Filed: Jan. 4, 2006

(65) Prior Publication Data

US 2006/0149507 A1 Jul. 6, 2006

(30) Foreign Application Priority Data

Jan. 5, 2005 (JP) ............... 2005-000702
Apr. 26, 2005 (JP) ............... 2005-127744

(51) Int. Cl.
*G06F 17/18* (2006.01)

(52) U.S. Cl. .............. 702/179; 702/180; 702/181; 702/182; 702/183; 702/184; 702/185; 702/186; 702/187; 702/188; 702/189; 702/196

(58) Field of Classification Search ............... 702/179, 702/180–182, 183–189, 196
See application file for complete search history.

(56) References Cited

U.S. PATENT DOCUMENTS 6,829,568 B2 * 12/2004 Julier et al. ............... 702/189

FOREIGN PATENT DOCUMENTS

DE 198 46 597 A1 4/1999

OTHER PUBLICATIONS

"Traceability of Coordinate Measurements According to the Method of the Virtual Measuring Machine", Part 2 of the Final Report Project MATI-CT94-0076, E. Trapet et al., PTB-F-35, Braunschweig, Mar. 1999.

"Reliability on calibration of CMM", Abbe M et al., Measurement, Institute of Measurement and Control, London, GB, vol. 33, No. 4, Jun. 2003, pp. 359-368, XP004423860, ISSN: 0263-2241.

"Statistical verification of conformance to geometric tolerance", Kurfess T R et al, Computer Aided Design, Elsevier Publishers BV., Barking, GB, vol. 27, No. 5, May 1995, pp. 353-361, XP004022789, ISSN: 00010-4485.

* cited by examiner

*Primary Examiner*—Hal Wachsman
*Assistant Examiner*—Phuong Huynh
(74) *Attorney, Agent, or Firm*—Rankin, Hill, Porter & Clark LLP

(57) ABSTRACT

Measured values obtained in a measuring machine to be estimated are provided to estimate errors in the measured values. Based on the estimated errors in the measured values, a covariance matrix or correlation matrix of measured values is derived. The covariance matrix or correlation matrix is then subjected to eigenvalue decomposition to derive eigenvalues and eigenvectors. A normal random number with an expected value of 0 and a variance equal to an eigenvalue corresponding to the eigenvalue is generated as a coefficient of coupling for each eigenvector, and all eigenvectors are linearly coupled to generate pseudo-measured values of the measuring machine. The generated pseudo-measured values are subjected to statistic processing to estimate uncertainty of the measuring machine.

8 Claims, 4 Drawing Sheets

METHOD AND PROGRAM FOR ESTIMATING UNCERTAINTY

CROSS REFERENCE TO RELATED APPLICATIONS

This application is based on and claims the benefit of priority from prior Japanese Patent Application No. 2005-702, filed on Jan. 5, 2005 and Japanese Patent Application No. 2005-127744, filed on Apr. 26, 2005, the entire contents of which are incorporated herein by reference.

BACKGROUND OF THE INVENTION

1. Field of the Invention

The present invention relates to a method and program for estimating uncertainty of measuring machines such as a CMM (Coordinate Measuring Machine) and others.

2. Description of the Related Art

In general, uncertainty of measuring machines can be computed by identifying all error factors and synthesizing them in consideration of error propagation. Uncertainty analysis by such the theoretical computation can be relatively easier to execute when a measuring system is simple and its uncertainty can be determined in a single way while it becomes very difficult as the system is complicated.

For example, measurement by a three-dimensional measuring machine is executed in accordance with an arbitrary measurement strategy (such as the number of measurement points, and measurement positions), and the shape is evaluated as various parameters (such as roundness, flatness and perpendicularity) through further complicated arithmetic processing. In such the complicated measurement, it is practically impossible for the theoretical error analysis to estimate uncertainty.

Methods of estimating the theoretical analysis-hard uncertainty include those currently growing into the mainstream, which employ the Monte Carlo technology. Among those, a method with the highest completion is the Virtual CMM method proposed by PTB (German Metrology Institute) et al. ("Traceability of coordinate measurements according to the method of the virtual measuring machine", PTB-Bericht, MAT1-CT94.0076, (1999)). The Virtual CMM method comprises forming a pseudo-three-dimensional measuring machine on a computer, and using the measuring machine to simulate measurement for estimation of uncertainty of the measuring machine. Initially, error factors in the three-dimensional measuring machine, the probe, and the environments are identified, and the magnitudes thereof are estimated through a preliminary measurement. These errors are multiplied by random numbers for swinging to generate pseudo-errors. The preliminary measurement, however, requires several days, which impose a considerably heavy burden on the user.

SUMMARY OF THE INVENTION

The present invention has been made in consideration of such the problem and has an object to provide a method and program for estimating uncertainty of measuring machines capable of estimating theoretical analysis-hard uncertainty of a measuring system using the Monte Carlo technology, suppressing the user's burden lower, and executing highly reliable uncertainty estimations.

To achieve the above object, the present invention provides A method of estimating uncertainty of measuring machines, comprising: estimating information of errors or precisions on a measuring machine to be estimated; deriving a covariance matrix or correlation matrix of measured values provided from the measuring machine based on the information estimated in the previous step; deriving eigenvalues and eigenvectors from eigenvalue decomposition of the covariance matrix or correlation matrix derived in the previous step; generating pseudo-measured values of the measuring machine by generating a normal random number as a coefficient of coupling for each eigenvector derived in the previous step and linearly coupling all eigenvectors, the normal random number having an expected value of 0 and a variance equal to an eigenvalue corresponding to the eigenvector; and estimating uncertainty of the measuring machine through statistical processing of the pseudo-measured values obtained in the previous step.

The present invention also provides a program for estimating uncertainty of measuring machines, which is a computer-executable program comprising the above-described steps.

The step of deriving the variance matrix or correlation matrix of measured values may include deriving a covariance matrix or correlation matrix of measured values of point-to-point distances based on errors in measured values provided from the estimated measuring machine.

The step of deriving the variance matrix or correlation matrix of measured values may include deriving a covariance matrix or correlation matrix of measured values of point-to-point distances based on a precision specification of the estimated measuring machine. The "estimated information on a measuring machine to be estimated" herein refers to the estimated "errors in measured values" or the estimated "uncertainty of measurement of point-to-point distances". The "measurement of point-to-point distances" includes not only measurement of spatial distances (such as measurement of a length between two points, and measurement of a coordinate value from the origin). It also includes measurement of relative temperatures, measurement of absolute temperatures, measurement of relative pressure, measurement of absolute pressure, and measurement of voltages.

To further improve the precision of uncertainty estimation, preferably the step of generating pseudo-measured values includes generating pseudo-measured values a plurality of times, and the step of estimating uncertainty of the measuring machine includes estimating uncertainty of the measuring machine through statistical processing of a plurality of pseudo-measured values.

If the measuring machine comprises a three-dimensional measuring machine, the step of generating pseudo-measured values may include generating pseudo-measured values along axes of the three-dimensional measuring machine independently on each axis.

The present invention employs means of simulation to generate pseudo-measured values. This makes it possible to estimate theoretical analysis-hard uncertainty, and estimate uncertainty with no preliminary measurement for identifying error factors in the environments and so forth. Accordingly, it is effective to suppress the user's burden lower than the existing methods.

DETAILED DESCRIPTION OF THE INVENTION

Embodiments of the present invention will now be described with reference to the drawings.

Figure 1:
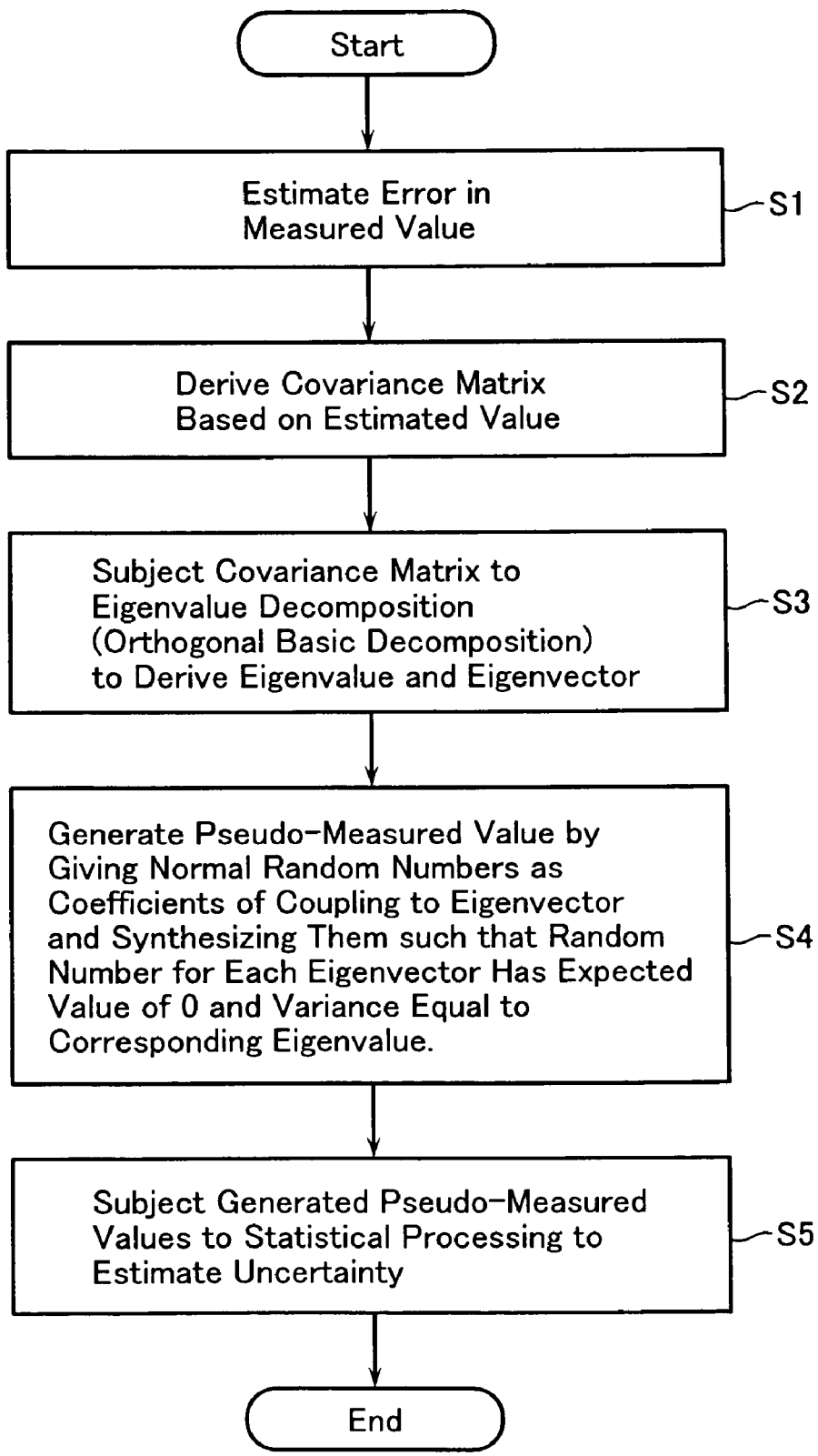
FIG. 1 is a flowchart showing a method of estimating uncertainty according to an embodiment of the invention.

FIG. 1 is a flowchart showing a procedure of a method of estimating uncertainty of measuring machines according to an embodiment of the invention. This uncertainty estimating method can be realized on a computer, which runs an uncertainty estimating program comprising the procedure described in the flowchart.

An outline of the estimating program is as follows. First, a pseudo-three-dimensional measuring machine is formed on a computer, and the measuring machine is used to simulate measurement to generate pseudo-measured values. The generated measured values are subjected to statistic processing to estimate uncertainty. In this case, a correlation among measured values is considered and an output from the Monte Carlo simulation is put under constraint to generate data similar to actual data. The importance on the consideration of the correlation among measured values is described below.

<Importance on Correlation Consideration>

Figure 2:
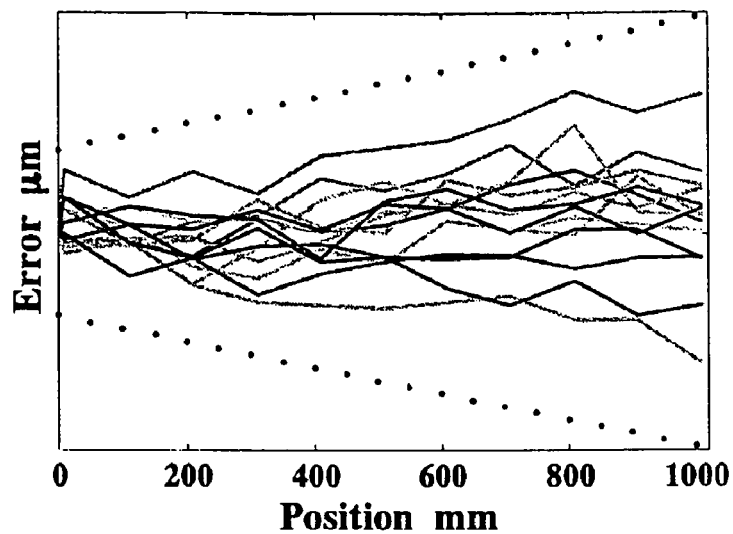
FIG. 2 is an illustrative view of measured values obtained from measurement of step gauges by a three-dimensional measuring machine.

By way of example, the value measured by the three-dimensional measuring machine is considered. FIG. 2 illustrates data from the three-dimensional measuring machine when it measures step gauges. The lateral axis indicates measurement positions, and the longitudinal axis indicates measurement errors, showing data of 14 gauges plotted in combination. As can be seen from this figure, measurement errors contain randomly swaying components, and slowly varying components depending on measurement lengths. It can be found from the comparison of both that the slowly varying components are dominant more than the random components. In such the measured result, if a distance between two points to be measured is short, the measured value (measurement error) also exhibits a relatively small value. It can be seen from a different viewpoint that, the shorter the distance between two points to be measured, the larger the correlation between the measured values while the longer the distance between two points to be measured, the smaller the correlation between the measured values.

Similar comments may apply to general measuring machines. For example, when N measurements are executed in a certain measuring machine, it is easy to estimate that the shorter the spatial or temporal distance between the measurements, the higher the possibility of obtaining similar values.

Figure 3:
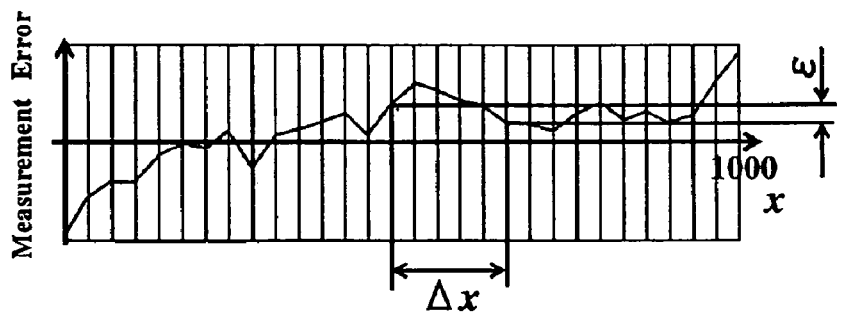
FIG. 3 is an illustrative view of measurement errors in the measured values.
Figure 4:
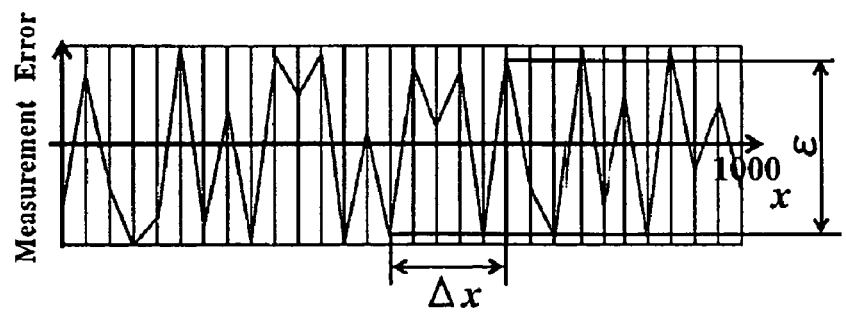
FIG. 4 is an illustrative view of measurement errors when simple random numbers are employed to generate pseudo-measured values instead of the measured values.

When random numbers are assigned to reproduce the measured values, it is important to consider the above-described correlation among the measured values. For example, FIGS. 3 and 4 show errors when step gauges are measured by a three-dimensional measuring machine, and those in pseudo-measured values generated with simple random numbers, respectively (the random numbers are uniform random numbers with only the same magnitude). After a distance is measured between two points at positions indicated by the arrow in the figure, both errors are compared. In this case, the error given the simple random number is found considerably larger than the actually measured value. This is an obvious overestimation. In a word, the Monte Carlo simulation using such the simple random number yields a result greatly exceeding the specification of the measuring machine and wastes the accuracy of the measuring machine uselessly. As obvious from the foregoing, it is effective on measurement simulation to generate pseudo-measured values in consideration of the correlation among measured values. In a word, the correlation should be considered to generate data highly similar to the actual measured value.

A method of estimating uncertainty in consideration of the actual correlation is described next based on FIG. 1.

Figure 5:
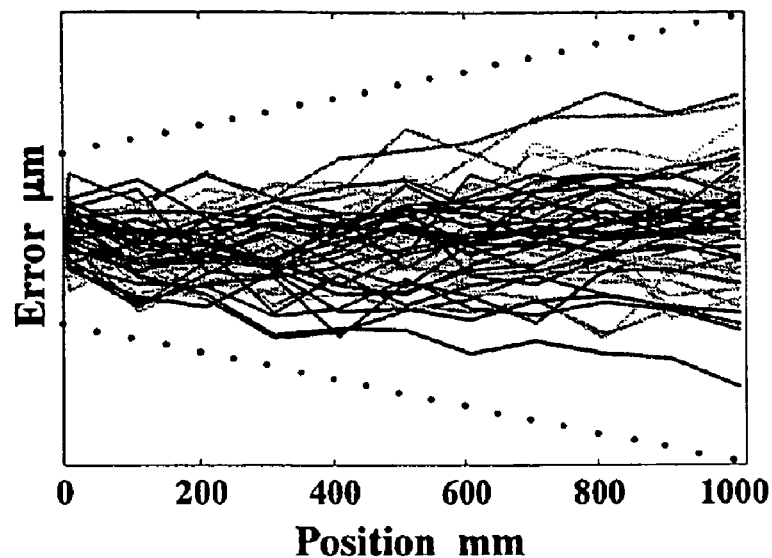
FIG. 5 is an illustrative view of test data as an example of input data in the present embodiment.

First, an error is estimated in a measured value from a measuring machine to be estimated (S1). As the measured value, actual test data as shown in FIG. 5 may be employed, for example.

Next, a pseudo-measured value is generated based on the measured value input. On generation of the pseudo-measured value, the constraint Monte Carlo simulation (hereafter referred to as "CMS") is employed. The CMS technology is executed in the following three stages.

(1) Based on the estimated value of the error obtained in S1, a covariance matrix of measured values is created (S2).

(2) The covariance matrix is subjected to eigenvalue decomposition (orthogonal basic decomposition) to create eigenvalues and eigenvectors (S3).

(3) Normal random numbers are given as coefficients of coupling to the created eigenvectors, which are then synthesized to create pseudo-measured values. The random number given to each eigenvector has an expected value of 0, and a variance determined equal to the corresponding eigenvalue (S4).

The three procedures of the CMS technology are described below in detail.

(1) Based on the estimated value of the error, the covariance matrix of measured values is created (S2).

It is assumed now that m values $[x_1, x_2, \ldots, x_m]$ are measured n times.

They are aligned to create a measured value matrix X as shown in the following Expression 1.

$$X = \begin{bmatrix} x_{11} & x_{21} & \cdots & x_{m1} \\ x_{12} & x_{22} & \cdots & x_{m2} \\ & & \vdots & \\ x_{1n} & x_{2n} & \cdots & x_{mn} \end{bmatrix} \quad \text{[Expression 1]}$$

In the measured value matrix X, an average $/x_i$ of each measured value is subtracted (where "/" means an overline hereafter) (i=1, 2, . . . , m) to yield an error matrix $X_e$ as shown in the following Expression 2. The matrix element corresponds to an error (estimated information) when the average is a true value.

$$X_e = \begin{bmatrix} x_{11} - \bar{x}_1 & x_{21} - \bar{x}_2 & \cdots & x_{m1} - \bar{x}_m \\ x_{12} - \bar{x}_1 & x_{22} - \bar{x}_2 & \cdots & x_{m2} - \bar{x}_m \\ & & \vdots & \\ x_{1n} - \bar{x}_1 & x_{2n} - \bar{x}_2 & \cdots & x_{mn} - \bar{x}_m \end{bmatrix}$$ [Expression 2]

$$= \begin{bmatrix} p_{11} & p_{21} & \cdots & p_{m1} \\ p_{12} & p_{22} & \cdots & p_{m2} \\ & & \vdots & \\ p_{1n} & p_{2n} & \cdots & p_{mn} \end{bmatrix}$$

where $$P_{ij} = x_{ij} - \bar{x}_i$$

A covariance matrix C of measured values can be derived using the error matrix $X_e$ as:

$$C = \frac{1}{N} X_e^T X_e = \begin{bmatrix} p_{11} & p_{12} & & p_{1n} \\ p_{21} & p_{22} & & p_{2n} \\ \vdots & \vdots & \cdots & \vdots \\ p_{m1} & p_{m2} & & p_{mn} \end{bmatrix}$$ [Expression 3]

$$\begin{bmatrix} p_{11} & p_{21} & \cdots & p_{m1} \\ p_{12} & p_{22} & \cdots & p_{m2} \\ & & \vdots & \\ p_{1n} & p_{2n} & \cdots & p_{mn} \end{bmatrix} = \begin{bmatrix} \sigma_1^2 & \sigma_{12} & & \sigma_{1m} \\ \sigma_{21} & \sigma_2^2 & & \sigma_{2m} \\ & & \ddots & \\ \sigma_{m1} & \sigma_{m2} & & \sigma_m^2 \end{bmatrix}$$

A diagonal term of this matrix is represented by:

$$\sigma_i^2 = \frac{1}{N} \sum_{k=1}^{n} (p_{ik})^2 = \frac{1}{N} \sum_{k=1}^{n} (x_{ik} - \bar{x}_i)^2$$ [Expression 4]

A non-diagonal term is represented by:

$$\sigma_{ij} = \frac{1}{N} \sum_{k=1}^{n} (p_{ik})(p_{jk}) = \frac{1}{N} \sum_{k=1}^{n} (x_{ik} - \bar{x}_i)(x_{jk} - \bar{x}_j)$$ [Expression 5]

where $$i = 1\,2 \cdots m, \; j = 1\,2 \cdots m$$

These terms are variance and covariance, respectively.

(2) The covariance matrix is subjected to eigenvalue decomposition (orthogonal basic decomposition) to create eigenvalues and eigenvectors (S3).

The covariance matrix C can be represented by Expression 6.

$$C = VDV^{-1}$$ [Expression 6]

Eigenvector:

$$V = [[v_1][v_2] \cdots [v_m]]$$

Eigenvalue:

$$D = \begin{bmatrix} \lambda_1 & & & 0 \\ & \lambda_2 & & \\ & & \ddots & \\ 0 & & & \lambda_m \end{bmatrix}$$

Eigenvectors are all selected to intersect with each other at right angles. Namely, eigenvectors belonging to different eigenvalues originally intersect with each other at right angles. On the contrary, this may not be the case if eigenvalues have the same value. Accordingly, it is required to cause such the eigenvalues to intersect with each other at right angles.

(3) Normal random numbers are given as coefficients of coupling to the created eigenvectors, which are then synthesized to create pseudo-measured values (S4).

The pseudo-measured value ^x (where ^ indicates a superscript) is derived from the following Expression 7 with random numbers $\epsilon_i$.

$$\hat{x} = \varepsilon_1 [v_1] + \varepsilon_2 [v_2] + \varepsilon_3 [v_3] + \cdots + \varepsilon_m [v_m]$$ [Expression 7]

Each random number $\epsilon_i$ is determined to have:
[Expression 8]
An expected value: $E(\epsilon_i)=0$,
A variance: $Var(\epsilon_i)=\lambda_i$
N random numbers can be given to generate N pseudo-measured values ^x (^$x_1$, ^$x_2$, . . . , ^$x_N$).

A covariance matrix of N values coincides with the covariance matrix of original data. The data thus obtained is subjected as pseudo-measured values to statistical processing to estimate uncertainty of the measuring machine (S5).

Figure 6:
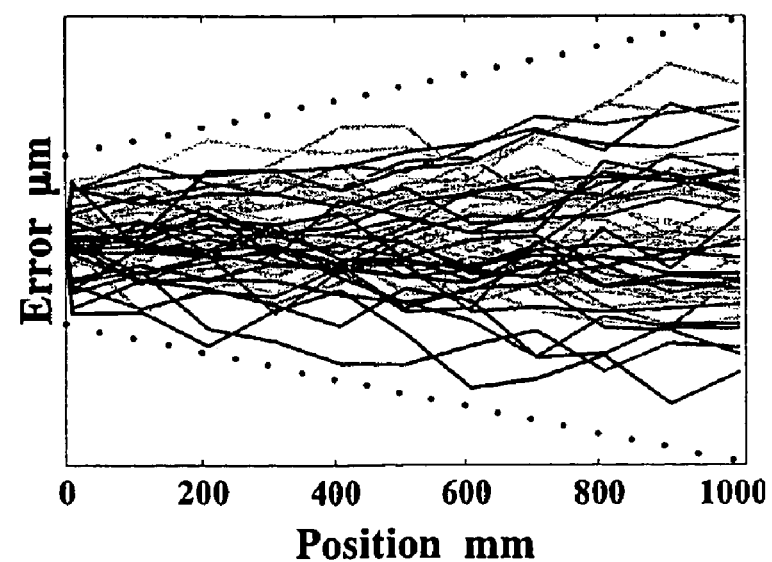
FIG. 6 is an illustrative view of pseudo-measured values generated in the present embodiment.

For example, the data as shown in FIG. 5 is employed to create a correlation matrix to result in generation of pseudo-measured values, which is shown in FIG. 6.

It can be confirmed that the simulation yields data similar to the original data (FIG. 5).

<Importance on Simulation Approach>

The importance on the use of simulation approaches is described next. The previous description is given to measurement of one-dimensional lengths, uncertainty of which can be estimated without the use of such the complicated means. It is also possible to estimate uncertainty directly from the data initially used. It is not simple, however, when some measurement is executed by stacking measuring mechanisms. A three-dimensional measuring machine includes mechanisms independently movable along x-, y- and z-axes, of which measurement errors appear in the stacked form. The measurement is executed after the user personally determines measurement positions. In addition, complicated arithmetic processing is applied to the obtained measured result to estimate a work as various shape parameters (such as perpendicularity, roundness, and flatness).

When uncertainty of such the complicated measurement is to be determined, a simulation-dependent method proves its worth. For example, the above-described procedure executed one-dimensionally may be executed independently on each axis of three-dimension to generate pseudo-measured values along respective axes. In this case, it is possible to create pseudo-measured values containing errors in a three-dimensional space. Accordingly, the shape parameters are computed from the pseudo-measured values. After the computations of the shape parameters and pseudo-measured values are repeated, the statistic of the obtained results is collected to estimate uncertainty of the measurement.

As shown, different random numbers are given to variances along mutually orthogonal axes in a multi-dimensional space to reproduce a distribution similar to the original data. Because of the mutually orthogonal axes, random numbers can be given along respective axes independently. This is a large characteristic of the present embodiment as well.

In the above embodiment, the method of deriving the covariance matrix of measured values employs the estimated error matrix of measured values obtained in the measuring machine to be estimated. When a precision specification of the estimated measuring machine is known, the covariance matrix or correlation matrix of measured values can be derived without the use of the estimated errors in measured values.

Figure 7:
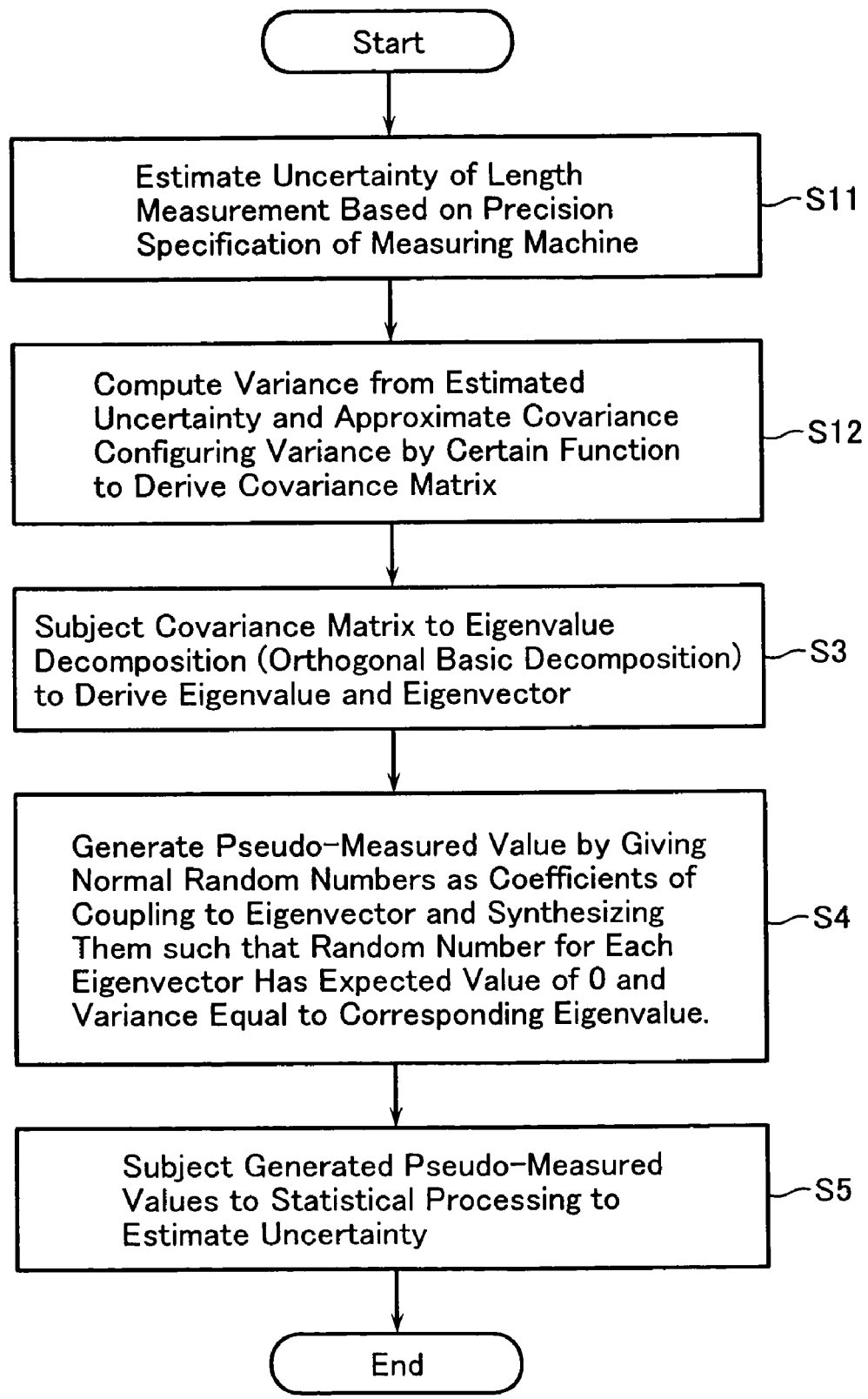
FIG. 7 is a flowchart showing a method of estimating uncertainty according to another embodiment of the invention.

Such an embodiment is shown in FIG. 7. In a method of this embodiment, based on the precision specification of the estimated measuring machine, uncertainty of length measurement as an example of point-to-point measurement is estimated (S11). Then, (a) a variance is computed from the uncertainty of length measurement (estimated information), and (b) a covariance that configures the computed variance is approximated by a certain function (such as a secondary function), which decreases as the evaluated length distance increases, to (c) derive a covariance matrix or correlation matrix (S12).

This embodiment is extremely efficient in practice because there is no need for executing actual measurement that requires various setups, and thus it is effective.

What is claimed is:

1. A computer-based method of estimating uncertainty of measuring machines, comprising:
    estimating in a computer information of errors or precisions on a measuring machine to be estimated;
    deriving a covariance matrix or correlation matrix of measured values provided from the measuring machine based on the information estimated in the previous step;
    deriving eigenvalues and eigenvectors from eigenvalue decomposition of the covariance matrix or correlation matrix derived in the previous step;
    generating pseudo-measured values of the measuring machine by generating a normal random number as a coefficient of coupling for each eigenvector derived in the previous step and linearly coupling all eigenvectors, the normal random number having an expected value of 0 and a variance equal to an eigenvalue corresponding to the eigenvector;
    estimating uncertainty of the measuring machine through statistical processing of the pseudo-measured values obtained in the previous step; and
    communicating the estimated uncertainty of the measuring machine obtained in the previous step to a user of the computer.

2. The method of estimating uncertainty of measuring machines according to claim 1, wherein the step of estimating information of errors or precisions on the measuring machine includes
    estimating errors in measured values provided from the estimated measuring machine.

3. The method of estimating uncertainty of measuring machines according to claim 2, wherein the step of deriving the variance matrix or correlation matrix of measuring values includes
    deriving a covariance matrix or correlation matrix of measured values of point-to-point distances based on the estimated errors.

4. The method of estimating uncertainty of measuring machines according to claim 1, wherein the step of estimating information of errors on precisions on the measuring machine includes
    estimating uncertainty of length measurement based on a precision specification of the estimated measuring machine.

5. The method of estimating uncertainty of measuring machines according to claim 4, wherein the step of deriving the variance matrix or correlation matrix of measuring values includes
    deriving a covariance matrix or correlation matrix of measured values of point-to-point distances based on the estimated uncertainty of length measurement.

6. The method of estimating uncertainty of measuring machines according to claim 1, wherein the step of generating pseudo-measured values includes generating pseudo-measured values a plurality of times, and
    wherein the step of estimating uncertainty of the measuring machine includes estimating uncertainty of the measuring machine through statistical processing of a plurality of pseudo-measured values.

7. The method of estimating uncertainty of measuring machines according to claim 1, wherein the measuring machine comprises a three-dimensional measuring machine, and
    wherein the step of generating pseudo-measured values includes generating pseudo-measured values along axes of the three-dimensional measuring machine independently on each axis.

8. A program embodied in computer-readable media for estimating uncertainty of measuring machines using a computer, comprising computer-executable steps of:
    estimating information of errors or precisions on a measuring machine to be estimated;
    deriving a covariance matrix or correlation matrix of measured values provided from the measuring machine based on the information estimated in the previous step;
    deriving eigenvalues and eigenvectors from eigenvalue decomposition of the covariance matrix or correlation matrix derived in the previous step;
    generating pseudo-measured values of the measuring machine by generating a normal random number as a coefficient of coupling for each eigenvector derived in the previous step and linearly coupling all eigenvectors, the normal random number having an expected value of 0 and a variance equal to an eigenvalue corresponding to the eigenvector;
    estimating uncertainty of the measuring machine through statistical processing of the pseudo-measured values obtained in the previous step; and
    communicating the estimated uncertainty of the measuring machine obtained in the previous step to a user of the computer.

* * * * *